Sept. 12, 1961 A. L. VERDIER 2,999,762
PROCESS FOR MANUFACTURING BINARY MIXTURES OF LIQUID
SUBSTANCES WITH A PULVERULENT MATERIAL
Filed July 12, 1957 2 Sheets-Sheet 2

INVENTOR
ANDRÉ LOUIS VERDIER

By Linton and Linton
ATTORNEYS

United States Patent Office 2,999,762
Patented Sept. 12, 1961

2,999,762
PROCESS FOR MANUFACTURING BINARY MIXTURES OF LIQUID SUBSTANCES WITH A PULVERULENT MATERIAL
André Louis Verdier, Paris, France
Filed July 12, 1957, Ser. No. 671,633
Claims priority, application France Aug. 2, 1956
3 Claims. (Cl. 106—309)

The present invention concerns a process for manufacturing binary mixtures of a liquid with a pulverulent mineral material.

The process according to the present invention finds its utilization in numerous industries (paints, inks, plastics, rubber) in which, at a given stage of manufacture, it is necessary to disperse in a more or less viscous liquid mass, a mineral filler or a pigment, which may be extremely fine (in particles for instance from one micron to a few millimicrons).

Now, great difficulties are encountered with the methods used heretofore, to bring about a perfect dispersion of the solid particles in the liquid phase, and consequently, to obtain strictly homogeneous binary mixtures.

The present invention makes it possible to obviate these drawbacks.

The process according to the present invention for obtaining binary mixtures of a predetermined composition, the solid phase of which is constituted by a pulverulent mineral material and its liquid phase by a coating agent of low volatility capable of coating said material, is chiefly characterized in that the pulverulent material is dispersed in a mass of liquid, the volume of which is several times larger than that corresponding to the composition of the desired mixture, this dispersion being effected in a gradual manner, after which the excess of liquid volume is extracted by any known means until the remaining binary mixture reaches the desired composition.

The relatively large liquid mass involved and a gradual incorporation of the particles allows the coating and the perfect dispersion of these particles.

Among the pulverulent products capable of being dispersed by the process according to the present invention, the following may be mentioned:

The inert fillers used in the rubber or paint industries (white fillers or colored fillers).

The pigments used in paints and the reinforcing fillers put in the rubber.

The following table gives, by way of non-limitative examples a list of dispersible mineral materials, the corresponding coating agents and the principal utilization of the binary mixtures thus set up.

| Mineral Material | Coating Agent | Utilization |
|---|---|---|
| Zinc oxide | Linseed oil or other siccative oils. | Thick paints and related paints. |
| Titanium di-oxide | | |
| Lithopone | Tricresylphosphate or other esters of low volatility. | Synthetic paints or plastic materials. |
| Calcium carbonate | | |
| Barium sulphate | Pine tar or heavy mineral oils or stearic acid. | Rubber industry. |
| silica and silicates. | | |
| Iron oxide | | |

The liquid phase involved, an agent of low volatility, exists preferably in the formulae for paints, printing inks, rubber, plastic materials and the like as a binder or a plastifier.

This liquid agent may thus be constituted by the following substances:

A mixture of heavy hydrocarbons (mineral oil residues, paraffin, waxes, pine tar).

An ester with a high boiling point (phthalates, phosphates).

A fatty substance (vegetable oils such as linseed oil, China-wood oil, castor oil), a fatty acid (stearic acid); a fatty substance combined with a resin (oleoglycerophthalic resin).

According to a first feature of the present invention, the dispersion of the pulverulent mineral material is carried out gradually which permits at any instant to have only a small volume of powder present in a homogeneous mass in which the liquid phase is predominant. Thus any agglomeration of solid particles may be avoided.

According to a second and important feature of the present invention, the dispersion is effected preferably in the presence of a conditioned atmosphere in sealed connection with the medium in which the particles were formed.

Under such conditions, the solid particles are incorporated into the liquid phase without going through any other ambient medium than that of their production. As any introduction of outside air, possibly richer in oxygen and of a different hygrometric condition, is avoided, the particles have no tendency to agglomerate together or to undergo modifications in their surface conditions.

The liquid phase used is found again, partly, in the formula for the final product. The latter offers a viscosity which varies according to the fineness of the particles, the nature of the coating agent, and the rate of extraction of the latter.

According to the present invention, it is possible in this manner to produce mixtures having the appearance of a solid (owing to a very thorough extraction of the liquid phase) although all their particles remain wetted.

These intermediate products which pertain to the present invention can, in turn, be dispersed very easily throughout a liquid or viscous phase identical with or different from the first one. The storing of these concentrated intermediate mixtures offers marked advantages as compared to that of the dry pulverulent materials.

In fact, the liquid phase, even in the form of an infinitely thin film which separates the solid particles, plays a very important protective part in the preservation of the intermediate products:

A physical or mechanical protection, avoiding the agglomeration of the particles by means of compression and of absorption of humidity.

An electrical protection, preventing the agglomeration of particles by electrostatic attraction.

A chemical protection, avoiding the action of atmospheric agents on the particles.

The storing of the pulverulent material in this form is thus very advantageous.

Other features of the present will appear from the following description.

In the drawings, given by way of non-limitative examples.

FIG. 3 shows under the same conditions, apparatus for another application relating to the dispersion of a pulverulent material obtained by milling such as lithopone in linseed oil.

Figure 1:
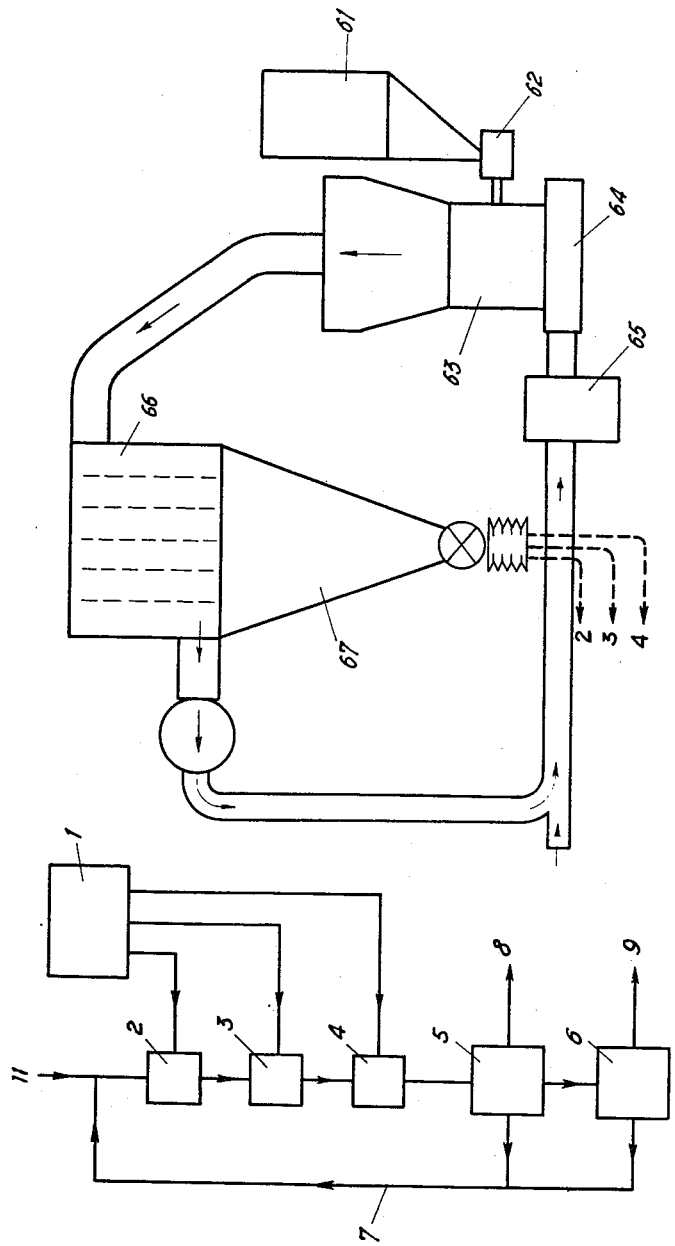
FIG. 1 shows, diagrammatically, a flow diagram of an apparatus for the realization of the process according to the present invention.

Referring to FIGURE 1, 1 is the tank containing the pulverulent material to be dispersed.

The tank 1 feeds, in parallel, the homogenizers 2, 3, 4 of a battery containing the liquid phase. The said homogenizers which are assembled in series, supply two extractors 5 and 6 such as centrifugal machines or presses, also connected in series, and which are in communication with homogenizer 2 through the duct 7.

Under these conditions, the liquid phase which reaches homogenizer 2 becomes loaded, gradually, at the level of the homogenizers 2, 3, 4 with solid particles which are dispersed in a liquid volume definitely greater than that which corresponds to the final ratio desired. This dispersion is thus effected in the best conditions.

The perfectly homogeneous mixture going out of homogenizer 4 is concentrated as regards the solid phase, in the extractors 5 and 6 which deliver, at 8 and 9 respectively, a paste and blocks having a solid appearance although all its particles remain wet.

Of course, means are provided for regenerating the liquid phase, which is recycled by means of the duct 7 in order to compensate, by an addition 11 of fresh liquid, for the amount extracted at 8 and 9.

Figure 2:
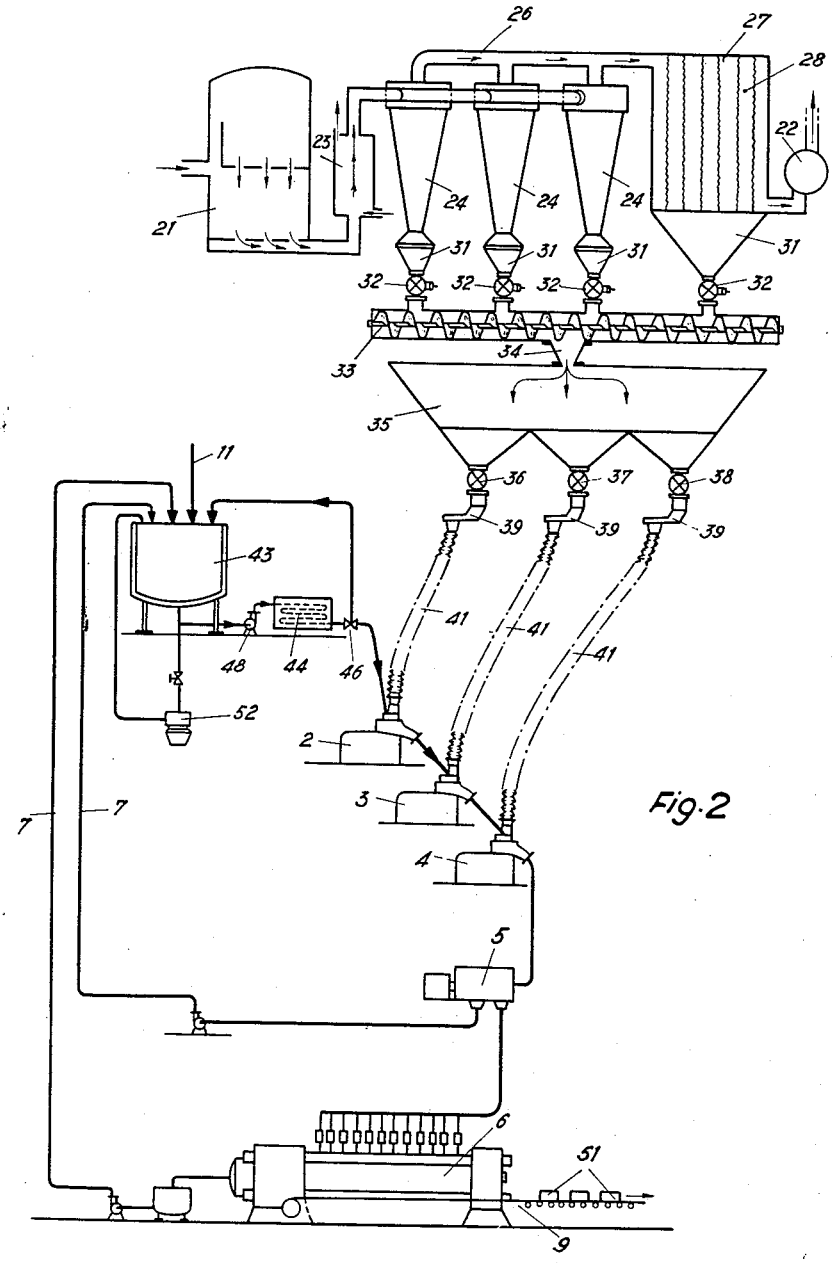
FIG. 2 shows, in greater detail, a preferred apparatus for the application of this process when the pulverulent material to be dispersed is obtained by reaction in a gaseous medium as zinc oxide flakes in petroleum oil, the zinc oxide flakes being dispersed in a gaseous medium in communication with the gaseous medium in which it was formed.

According to the example of FIGURE 2 concerning a plant for dispersing zinc oxide into petroleum oil (consisting of a mixture of heavy residual hydrocarbons), it has been intended to obtain a dispersion in a conditioned atmosphere, in sealed communication with the gaseous medium in which the particles have been formed.

There may be seen an oven 21 which produces zinc oxide in small flakes. A suction fan 22 produces a gaseous current which carries the zinc oxide particles through a heat exchanger 23, cyclones 24, of which the outlet pipes 26 open into a chamber 27 containing air hoses 28.

The zinc oxide powder, the granulometry of which ranges from 0.1 to a few microns, is collected at the lower portion 31 of the cylones 24 and of the chamber 27.

It will be noted that, owing to the arrangement of the heat exchanger 23, the particles are not placed in contact with the outside atmosphere.

Air gates 32 cause the zinc oxide powder to fall onto an air tight conveyor screw 33, which, through a spout 34 delivers it to a storage hopper, 35, also air tight, so that the gaseous medium with which the particles are in contact does not differ from that in which they have been formed.

The hopper 35 is provided with three air gates 36, 37, 38, each one provided with a vibrator 39 which permits to deliver zinc dust through tight, flexible hoses, 41, a staged set of three continuous homogenizers 2, 3, 4 being connected in parallel as in the case of FIGURE 1.

A storage tank 43 contains pretroleum oil, maintained at a constant temperature by a heating system including a thermostat 44 provided with a by-pass 46. A circulation pump 48 sends, at a constant rate of flow, the petroleum oil, at a constant temperature, into the homogenizer 2.

The quantities of oil and zinc oxide supplied are such that, for the homogenizers 2, 3, 4 arranged as in FIGURE 1 the actual volume ratios solid phase/liquid phase are equal respectively to 1/6, 2/6 and 3/6.

At the outlet from homogenizer 4, all the particles of zinc oxide are dispersed through the petroleum oil and have been made insensitive to the action of the outside atmosphere. The sealing system may, therefore, stop downstream of the homogenizer 4. Air-tightness may be ensured, however, over the entire circuit, to avoid a possible oxidizing of the recycled liquid phase.

The continuous squeezing machine 5 carries on the concentration in zinc oxide and permits to adjust exactly the concentration of petroleum oil. The paste thus obtained, which contains 60% zinc oxide and 40% oil (by volume) (or 90% oxide and 10% oil by weight) is sent to a hydraulic press filter 6 (for instance an automatic press with twelve ports).

The press filter 6 again raises the concentration in zinc oxide in the sedimentary phase and delivers at 9, cakes 51, in a solid condition but in which all the solid particles remain coated with a thin oil film. The composition of these cakes corresponds to 76% oxide and 24% oil by volume (i.e. 95% oxide and 5% oil by weight).

The petroleum oil, recycled and sent through the conduits 7 into the tank 43 is decanted. A centrifugal machine 52 permits purification of the recycled liquid, if necessary.

The cakes 51 may be advantageously used for manufacturing rubber base mixtures.

These cakes are introduced into a mixer, while incorporating therein the other materials necessary for the preparation of the mixture (gums, other fillers, pigments, plastifiers and the like).

The pulverulent constituents of these mixtures may also be introduced, themselves, in the shape of solid cakes prepared in accordance with the present invention.

The quality of the products thus manufactured is especially remarkable.

The embodiment of FIGURE 3 concerns the dispersion in linseed oil, of a pulverulent material consisting of lithopone (a white pigment obtained by milling a combination of barium sulphate and zinc sulphide), the various mixtures obtained in accordance with the present invention being intended for the manufacturing of fatty paints.

The lithopone is stored at 61, brought by an automatic conveyor 62 into a centrifugal crushing or milling mill 63 provided with an air collector 64 which receives conditioned air (temperature and hygrometric condition) from a unit 65 provided for that purpose, which avoids any modification in the surface condition of the milled particles and in their agglomeration. The lithopone is collected in a hopper 66 provided with air hoses and stored at 67. It is conveyed, through a system of an air-tight distributor and conduits similar to that of FIGURE 2 to homogenizers such as 2 which are parts of a system for the continuous circulation of the linseed oil, of the type of FIGURE 2.

The dispersion of the lithopone is thus effected in the presence of the air which surrounded the raw material during its milling.

It is obvious that the present invention is not limited to the modes of embodiment specifically described and that various modifications may be made thereto, particularly as to the choice of the equipment capable of realizing the various physical operations according to the present invention.

I claim:

1. A process for producing homogeneous binary mixtures of a predetermined composition, useful for the further preparation of rubber articles, paints, inks and plastics and consisting of particles of a solid phase thoroughly dispersed within a liquid phase, said solid phase being constituted by particles of pulverulent materials selected from the group of the pigments and fillers for said rubber articles, paints, inks and plastics, consisting of zinc oxide, titanium dioxide, lithopone, calcium carbonate, barium sulphate, silica, and iron oxide, and the liquid phase consisting of an agent of low volatility, capable of coating said particles and selected from the group of binders and plastifiers for said rubber articles, paints, inks and plastics, consisting of mineral oil residues, waxes, pine tar, linseed oils, China-wood oils, castor oils, stearic acid, oleoglycerophthalic resin, tricresylphosphate, said particles further being continuously formed in an enclosure separate from the outer atmosphere and being surrounded after they have been formed by a specific gaseous medium, said process comprising continuously collecting said particles from said enclosure while preventing any contact thereof with the outer atmosphere, continuously conveying in parallel through air-tight ducts said collected particles to a plurality of air-tight homogenizers in liquid communication with each other, continuously dispersing said particles in each homogenizer through a flow of said liquid phase continuously circulated in a closed circuit through successively each of said homogenizers, said conveying and dispersing being performed in the presence of said gaseous medium only for preventing self-agglomeration of said particles before being dispersed, adjusting the supply of said particles to said homogenizers and the rate of flow of said liquid therethrough so as to have at any instant a small volume of particles in the presence of a homogeneous mass in which the liquid phase is predominant, the volumetric liquid to solid ratio further being several times larger than that which corresponds to said predetermined composition, thereby obtaining a binary mixture having a liquid content in excess, thereafter continuously removing said liquid content in excess by circulating said mixture through serially disposed mechanical concentrating stages until the remaining binary mixture delivered by said stages reaches the desired composition, and recirculating said removed content of liquid in excess within said flow of liquid through said homogenizers.

2. In a process for continuously producing extremely fine solid particles of a pulverulent material, by a chemical reaction performed at elevated temperature in a substantially closed oven, whereby said particles are surrounded after they have been formed by a specific gaseous medium consisting of hot combustion gases, said pulverulent material consisting of zinc oxide, the steps continuously performed as soon as said particles are formed comprising cooling by heat exchange said particles while preventing any contact thereof with the outer atmosphere, collecting said cooled particles within air-tight containers, conveying in parallel through air-tight ducts said collected particles to a plurality of air-tight homogenizers in liquid communication with each other, dispersing said particles in each homogenizer through a flow of a liquid phase consisting of an agent of low volatility capable of coating said particles and selected from the group of binders and plastifiers for rubber articles, paints, inks and plastics, consisting of mineral oil residues, waxes, pine tar, linseed oils, China-wood oils, castor oils, stearic acid, oleoglycerophthalic resin, and tricresylphosphate, said liquid phase being circulated in a closed circuit through each of said homogenizers successively, said conveying and dispersing being performed in the presence of said combustion gases only for preventing self-agglomeration of said particles before being dispersed, adjusting the supply of said particles to said homogenizers and the rate of flow of liquid therethrough so as to have at any instant a small volume of particles in the presence of a homogeneous mass in which the liquid phase is predominant, thereby obtaining a binary mixture having a liquid content in excess, thereafter continuously removing said liquid content in excess by circulating said mixture through serially disposed mechanical concentrating stages thereby producing a binary mixture having a substantial concentration in solid particles, whereas said particles remain coated by said liquid phase, and recirculating said removed content of liquid in excess with said flow of liquid through said homogenizers.

3. A process for producing homogeneous binary mixtures of a predetermined composition, useful for the further preparation of rubber articles, paints, inks and plastics, and consisting of particles of a solid phase thoroughly dispersed within a liquid phase, said solid phase being constituted by particles of pulverulent materials consisting of lithopone, and the liquid phase consisting in an agent of low volatility, capable of coating said particles and selected from the group of binders and plastifiers for rubber articles, paints, inks and plastics, consisting of mineral oil residues, waxes, pine tar, linseed oils, China-wood oils, castor oils, stearic acid, oleoglycerophthalic resin and tricresylphosphates, said particles further being continuously formed by a milling operation performed in an enclosure separate from the outer atmosphere and in the presence of conditioned air having definite temperature and hygrometric conditions, said process comprising the steps continuously performed as soon as said particles are formed consisting of collecting said particles from said enclosure while preventing any contact thereof with the outer atmosphere, conveying in parallel through air-tight ducts said collected particles to a plurality of air-tight homogenizers in liquid communication with each other, dispersing said particles in each homogenizer through a flow of said liquid phase circulated in a closed circuit through each of said homogenizers successively, said conveying and dispersing being performed in the presence of said conditioned air only, for preventing self-agglomeration of said particles before being dispersed, adjusting the supply of said particles to said homogenizers and the rate of flow of said liquid therethrough so as to have at any instant a small volume of particles in the presence of a homogeneous mass in which the liquid phase is predominant, the volumetric liquid-to-solid ratio further being several times larger than that which corresponds to said predetermined composition, thereby obtaining a binary mixture having a liquid content in excess, thereafter removing said liquid content in excess by circulating said mixture through serially disposed mechanical concentrating stages until the remaining binary mixture delivered by said stages reaches the desired composition, thereby producing a binary mixture having a substantial concentration in solid particles, whereas said particles remain coated by said liquid phase, and recirculating said removed content of liquid in excess within said flow of liquid through said homogenizers.

References Cited in the file of this patent

UNITED STATES PATENTS

| | | |
|---|---|---|
| 2,009,435 | Coolidge et al. | July 30, 1935 |
| 2,021,143 | Calcott et al. | Nov. 19, 1935 |
| 2,113,539 | Meister | Apr. 5, 1938 |
| 2,713,006 | Hunter | July 12, 1955 |
| 2,727,827 | Chertkof | Dec. 20, 1955 |

OTHER REFERENCES

Jolly: Paint Manufacture, July 1937, page 227.

"A Study of Pigment Dispersion," Paint Oil and Chemical Review, November 23, 1950, pages 88–94.

The Condensed Chemical Dictionary, fourth edition, 1950, page 702.